United States Patent
Shah

(10) Patent No.: US 11,232,462 B2
(45) Date of Patent: Jan. 25, 2022

(54) ASSIGNING CUSTOMER LIFETIME VALUE CREDIT BASED ON ENGAGEMENT

(71) Applicant: eBay Inc., San Jose, CA (US)

(72) Inventor: Maunish Shah, Meilen (CH)

(73) Assignee: eBay Inc., San Jose, CA (US)

(*) Notice: Subject to any disclaimer, the term of this patent is extended or adjusted under 35 U.S.C. 154(b) by 972 days.

(21) Appl. No.: 15/941,318

(22) Filed: Mar. 30, 2018

(65) Prior Publication Data

US 2019/0303954 A1    Oct. 3, 2019

(51) Int. Cl.
*G06Q 30/02* (2012.01)
(52) U.S. Cl.
CPC .................. *G06Q 30/0201* (2013.01)
(58) Field of Classification Search
None
See application file for complete search history.

(56) References Cited

U.S. PATENT DOCUMENTS

| | | | |
|---|---|---|---|
| 2010/0241501 A1* | 9/2010 | Marshall | G06Q 30/0222 705/14.13 |
| 2014/0278798 A1* | 9/2014 | Goyal | G06Q 30/0204 705/7.33 |

FOREIGN PATENT DOCUMENTS

| | | | | |
|---|---|---|---|---|
| WO | WO-2013023185 A1 * | 2/2013 | ............ | G06Q 50/01 |
| WO | WO-2013097054 A1 * | 7/2013 | ............ | G06Q 30/00 |

OTHER PUBLICATIONS

Bujlowetal, A Survey on Web Tracking: Mechanisms, Implications, and Defenses, 2017 (Year: 2017).*

* cited by examiner

*Primary Examiner* — Mohamed N El-Bathy
(74) *Attorney, Agent, or Firm* — Schwegman Lundberg & Woessner, P.A.

(57) ABSTRACT

Disclosed are systems, methods, and non-transitory computer-readable media for assigning a Customer Lifetime Value (CLV) credit to an affiliate based engagement. Affiliate marketers are assigned a monetary CLV credit for new customers driven to an online retailer website by the affiliate. A CLV credit is a monetary award calculated based on a determined CLV for the new customer. The CLV represents an expected net profit to the online retailer that is attributed to the future relationship with the new customer. To ensure that the customer drives the expected net profit, the CLV credit is assigned to the affiliate marketer based on the measured engagement of the new customer. For example, the affiliate marketer is initially assigned only a portion of the CLV credit and then assigned additional portions when the new customer's engagement meets predetermined milestones, such as the new customer making at least one purchase per quarter.

14 Claims, 9 Drawing Sheets

ASSIGNING CUSTOMER LIFETIME VALUE CREDIT BASED ON ENGAGEMENT

TECHNICAL FIELD

An embodiment of the present subject matter relates generally to assigning customer lifetime value (CLV) credits and, more specifically, to assigning a CLV credit based on engagement.

BACKGROUND

Online affiliate marketing is commonly used to drive new customers to online retailers. For example, affiliates place content on websites that encourage users to shop with the online retailer. Current systems reward an affiliate for each new customer based on a calculated CLV that represents an expected net profit to the online retailer that is attributed to the future relationship with the new customer. For example, an affiliate may be paid a percentage of the CLV for the new customer. Currently, affiliates are paid the entirety of this fee upon the new customer completing a desired action, such as making a purchase with the online retailer. This is not problematic if the new customer continues the relationship with the online retailer as expected. Unfortunately, this is not always the case, and in many instances the customer does not continue the relationship after the initial interaction. Further, the affiliate is no longer incentivized to encourage the new customer to continue the relationship with the online retailer because they have already been paid the entirety of their award.

The current approaches of one-time fees leads to inefficiencies in affiliate-retailer systems. At best, reward transactions are paid under an incorrect assumption, as the reward amount exceeds CLV for the new customer. The repeated occurrence of the stand-alone referral leads to a misuse of computer resources, as processing cycles are allocated over and over towards an economically in-efficient and unsustainable system. At worst, such inefficiencies lead to the termination of the affiliate-retailer relationships. While the referral fees of brick-and-mortar stores had no practical alternative other than one-time fees, the foray into e-commerce with online transactions presents an opportunity to introduce a more economically sound system, where computer processing can be applied to transactions in a manner that were neither practical nor practiced in the real-world business analogs. Accordingly, improvements by virtue of operating in an internet-centric environment must be considered.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for assigning a Customer Lifetime Value (hereinafter CLV) credit to an affiliate based engagement. Affiliate marketers are assigned a monetary CLV credit for new customers driven to an online retailer website by the affiliate. A CLV credit is a monetary award calculated based on a determined CLV for the new customer. The CLV represents an expected net profit to the online retailer that is attributed to the future relationship with the new customer. Previous methods assigned the full CLV credit to the affiliate at once. In many instances, however, the new customer does not drive the anticipated CLV to the online retailer website. To remedy this situation, the CLV credit is assigned to the affiliate marketer based on the measured engagement of the new customer. For example, the affiliate marketer is initially assigned only a portion of the CLV credit and then assigned additional portions when the new customer's engagement meets predetermined milestones, such as the new customer making at least one purchase per quarter.

Figure 1:
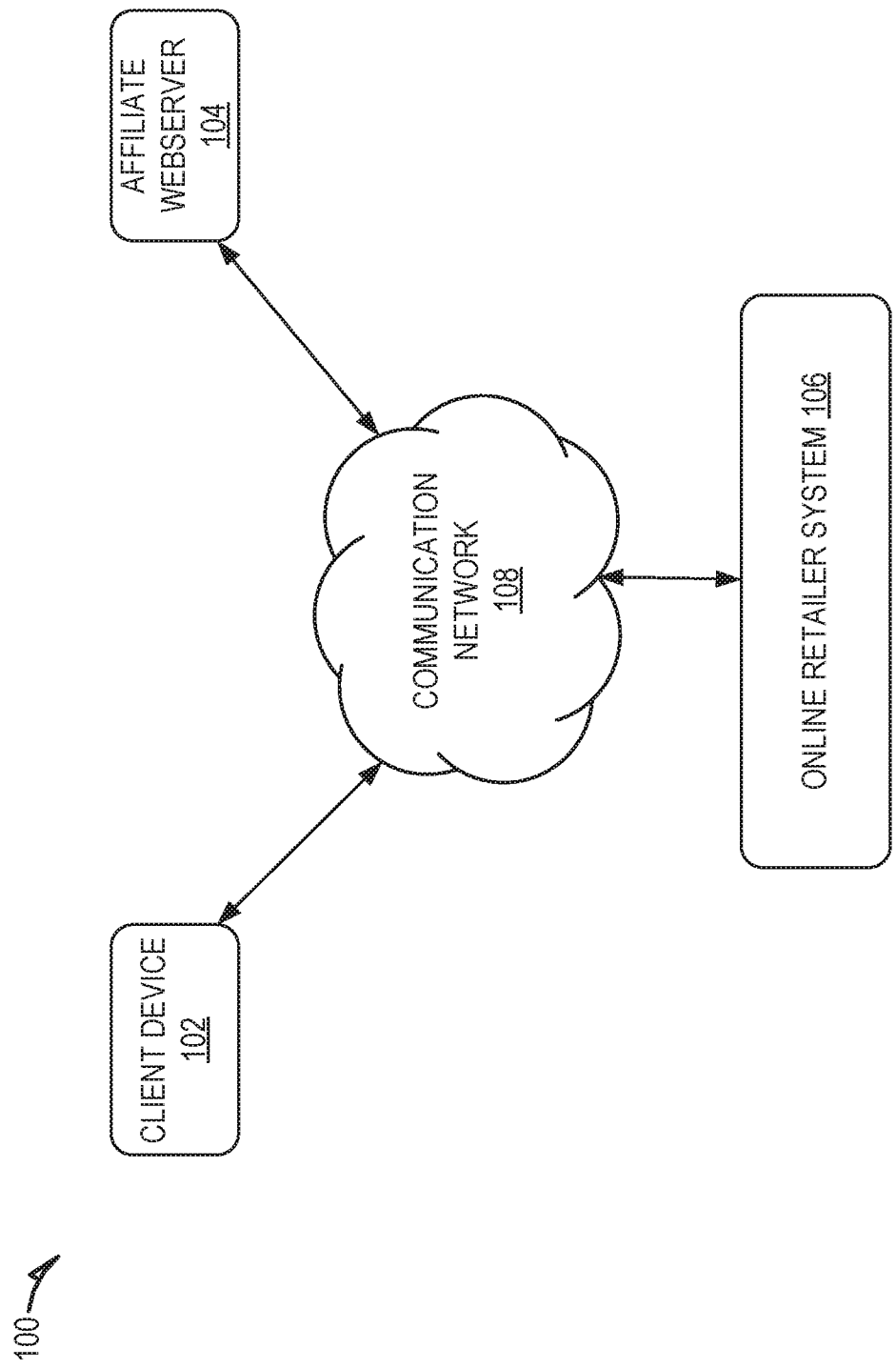
FIG. 1 shows an example system configuration, wherein electronic devices communicate via a network for purposes of exchanging content and other data.

FIG. 1 shows an example system configuration 100, wherein electronic devices communicate via a network for purposes of exchanging content and other data. As shown, multiple devices (i.e., client device 102, affiliate webserver 104, and online retailer system 106) are connected to a communication network 108 and configured to communicate with each other through use of the communication network 108. The communication network 108 is any type of network, including a local area network ("LAN"), such as an intranet, a wide area network ("WAN"), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the machine 700 shown in FIG. 7.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100, a user interacts with the affiliate webserver 104 and the online retailer system 106 using a client device 102. For example, the user uses the client devices 102 connected to the communication network 108 by direct and/or indirect communication to communicate with and utilize the functionality of the affiliate webserver 104 and the online retailer system 106. Although the shown system 100 includes only one client device 102 and affiliate webserver 104, this is only for ease of explanation and is not meant to be limiting. One skilled in the art would appreciate that the system 100 can include any number of client devices 102 and affiliate webservers 104. Further, the online retailer system 106 may concurrently accept connections from and interact with any number of client devices 102 and/or affiliate webservers 104. The online retailer system 106 supports connections from a variety of different types of client devices 102, such as desktop computers; mobile computers; mobile communications devices, e.g. mobile phones, smart phones, tablets; smart televisions; set-top boxes; and/or any other network enabled computing devices. Hence, the client device 102 may be of varying type, capabilities, operating systems, etc.

A user interacts with the affiliate webserver 104 and/or online retailer system 106 via a client-side application installed on the client device 102. In some embodiments, the client-side application includes a system specific component for communicating with the affiliate webserver 104 and/or online retailer system 106. For example, the component may be a stand-alone application, one or more application plug-ins, and/or a browser extension. However, the users may also interact with the affiliate webserver 104 and/or online retailer system 106 via a third-party application, such as a web browser, that resides on the client device 102 and is configured to communicate with the affiliate webserver 104 and/or online retailer system 106. In either case, the client-side application presents a user interface (UI) for the user to interact with the affiliate webserver 104 and/or online retailer system 106. For example, the user interacts with the affiliate webserver 104 and/or online retailer system 106 via a client-side application integrated with the file system or via a webpage displayed using a web browser application.

The online retailer system 106 is one or more computing devices configured to provide an online retail website that allows user to browse through products listed for sale, as well as purchase those products. For example, the online retailer system 106 provided a retailer interface that allows a user to view products listings for multiple products, select from specified products, etc. The retailer interface includes user interface elements, such as buttons, scroll bars, text boxes, etc., that allow the user to view, select, search and purchase products listed for sale by on the online retail website.

The affiliate webserver 104 is one or more computing devices configured to provide any type of online website that includes content that promotes a user to navigate to and/or purchase items from the online retail website provided by the online retailer system 106. For example, the affiliate webserver 104 may provide a website that provides web content, such as news, sports news, blogs, etc. The affiliate webserver 104 may also provide a service, such as a social networking service, stock purchasing service, a different online retailer, etc.

The affiliate webserver 104 presents affiliate content that promotes users to perform desired actions with relation to the online retail website. For example, the affiliate content may promote a user to access the online retail website, purchase an item or services from the online retail website, view additional content presented by the online retail website (e.g., video), etc. The affiliate content includes any type of web content, such as videos, images, links, text, etc. The affiliate content may be selectable by a user to navigate the user to the online retail website. For example, the affiliate content presents an advertisement for a product listed for sale by the online retail website, and a user may select the affiliate content to cause the client device 102 to request a specific webpage of the online retail website that offers the product for sale.

In some embodiments, the affiliate webserver 104 maintains a data store used to store the affiliate content. Accordingly, the affiliate webserver 104 accesses the affiliate content locally from the data store and incorporates the affiliate content into web content requested by a user using a client device 102. Alternatively, the affiliate webserver 104 accesses the affiliate content from another webserver (not shown) in network communication with the affiliate webserver 104. For example, the affiliate webserver 104 requests affiliate from the other webserver and combines the affiliate content into its own web content prior to providing the web content to the client device 102. As another example, the web content provided to the client device 102 causes the client device 102 to request the affiliate content from the other web server. The client device 102 then combines the affiliate content into the web content presented to the user.

The online retailer system 106 rewards the affiliate webserver 104 for each new customer that the online affiliate webserver 104 drives to the online retailer system 106. For example, the online retailer system 106 rewards the affiliate webserver 104 when the affiliate webserver 104 causes a new user to perform a desired action, such as purchase an item from the online retail website, register an account with the online retail website, etc.

The reward is a CLV credit that is assigned by the online retailer system 106 to an account associated with the affiliate webserver 104. A CLV credit is a monetary award calculated based on a determined CLV for the new customer. The CLV represents an expected net profit to the online retailer that is attributed to the future relationship with the new customer. Previous methods assigned the full CLV credit to the account associated with the affiliate at once. In many instances, however, the new customer does not drive the anticipated CLV to the online retailer website. To remedy this situation, the online retailer system 106 assigns portions of the CLV credit to the account associated with the affiliate webserver 104 based on the monitored engagement of the new customer over time. For example, the online retailer system 106 assigns the account associated with the affiliate webserver 104 only a portion of the CLV credit when the affiliate webserver 104 drives a new customer to the online retailer system 106. The online retailer system 106 monitors the new customer's engagement over time and assigned additional portions of the CLV credit when the new customer's engagement meets predetermined milestones, such as the new customer making at least one purchase per quarter. If the online retailer system 106 determines that the user has not met a predetermined milestone for a given time period (e.g., the user has not made an additional purchase during the given time period), the online retailer system 106 does not assign the additional portion of the CLV credit to the account associated with the affiliate webserver 104.

The practice of incrementally crediting affiliates presents a unique solution that is not feasible in brick-and-mortar systems. Keeping track of customers and the referral parties, such that portions of credits could be provided based on confirmatory behaviors validating CLV levels, was not a practical option-certainly not on any scalable level. By contrast, the instant invention leverages the ability to maintain a record over time of affiliates and user behavior through unique and affiliate account identifiers (further described below) such that a more efficient affiliate reward program can be instituted.

Figure 2:
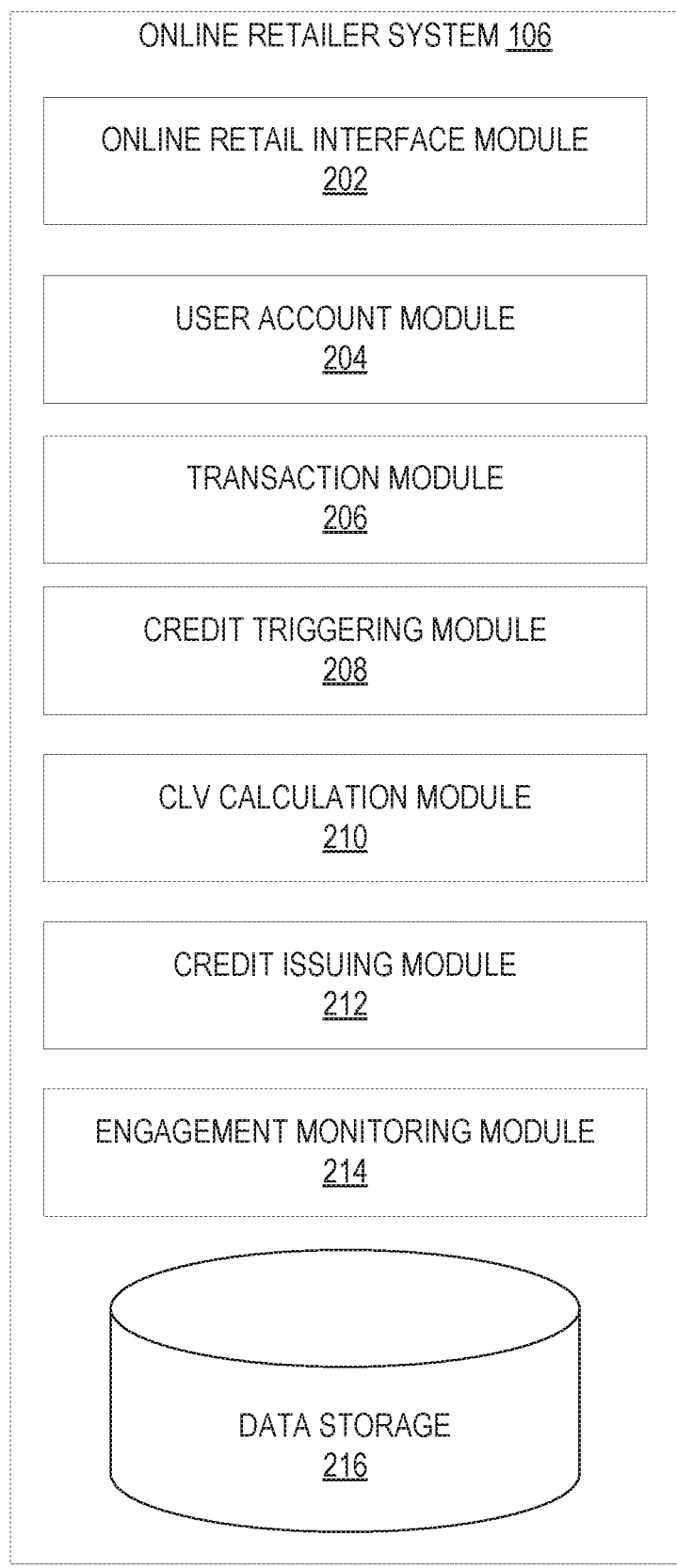
FIG. 2 is a block diagram of the online retailer system configured to assign a CLV credit based on engagement, according to some example embodiments.

FIG. 2 is a block diagram of the online retailer system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the online retailer system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the online retailer system 106 includes an online retail interface module 202, user account module 204, transaction module 206, credit triggering module 208, CLV calculation module 210, credit issuing module 212, engagement monitoring module 214, and a data storage 216. The online retail interface module 202 provides a retail interface that enables users to browse through items and/or services provided for sale by the online retailer website. For example, the retail interface includes user interface elements (e.g., buttons, scrollbars, text fields, etc.) that allow the user to view, select, search and purchase products listed for sale by on the online retail website.

The online retailer system 106 stores web content in the data storage 216 and provides requested web content to a requesting client device 102. For example, a user may use the client device 102 to select to view details of a specific product listed for sale by the online retail website. The online retail interface module 202 accesses web content describing the specific product from the data storage 216, and provides the web content to the client device, where it is presented to the user.

To purchase products from the online retail website, a user may create a user account with the online retailer system 106. Creating a user account includes selecting a user name and password, providing personal information, such as the user's name address, financial information, etc. The user account module 204 enables a user to create a user account with the online retailer system 106. For example, the user account module 204 prompts the user for specified data to create a user account. The user account module 204 creates a user account for the user in the data storage 216, where the user's provided data is stored.

The user account module 204 also generates a unique account identifier for each newly created user account. The unique account identifier is used to identify the user account and its corresponding user. The user account module 204 generates the unique account identifier using any of a number of known techniques that result in a unique identifier for each respective account. The unique identifier is stored in the data storage 216 and associated with the user's account.

The user account module 204 also stores data indicating whether the user was driven to the online retailer system 106 by an affiliate partner, such as the affiliate webserver 104. For example, a user that accesses the online retail website via affiliate content presented in web content provided by the affiliate webserver 104 and/or shortly after viewing affiliate content presented in web content provided by the affiliate webserver 104 can be determined to have been driven to the online retailer system 106. The user account module 204 determines whether a user was driven to the online retailer system 106 using any of a number of known techniques. For example, a request for web content maintained by the online retailer system 106 may be embedded with an information identifying the affiliate webserver 104 if the request was submitted as a result of the user selecting affiliate content presented by the affiliate webserver.

To identify that a user was driven to the online retailer system 106 by an affiliate, the user account module 204 includes an affiliate partner identifier in the user's account. The user account module 204 also includes a record indicating a day time that the user was driven to the online retailer system 106.

The user account module 204 monitors user interactions with the online retail website and records a record of specified interaction in the user's account in the data storage 216. This includes recording purchases made by the user, products viewed by the user, etc.

The transaction module 206 enables a user to complete a transaction with the online retail website. For example, the transaction module 206 gathers the user's financial information (e.g., credit card information, bank account information, etc.), and communicates with a server for the corresponding financial institutions to authorize the requested transaction. This enables a user to purchase products and/or services listed for sale on the online retail website.

The credit triggering module 208 determines whether a new customer driven to the online retailer system by an affiliate partner has performed an action that triggers the affiliate being assigned a credit for driving the new customer to the online retailer system 106. An affiliate partner, such as the affiliate webserver 104, is awarded a CLV credit when they drive a new customer (i.e., new user) to the online retailer system 106 and the new customer performs a predetermined action. For example, the predetermined action may include the new customer completing a purchase, purchasing a specified item, creating a user account with the online retailer system 106, etc. The credit triggering module 208 monitors user actions for new customers driven to the online retailer system 106 from an affiliate webserver 104, and determines whether the new customer has performed one of the predetermined actions that triggers the affiliate webserver 104 being assigned a credit for driving the new customer to the online retailer system 106. If the credit triggering module 208 determines that a new customer has performed a predetermined action, the credit triggering module 208 alerts the credit issuing module 212 to assign the CLV credit to an account associated with the affiliate webserver 104. This is discussed in greater detail below.

The CLV calculation module 210 calculated a CLV for a new customer and a CLV credit to be assigned to an affiliate webserver 104 for driving the new customer to the online retailer system 106. A CLV represents an expected net profit to the online retailer system 106 that is attributed to the future relationship with the new customer. For example, the CLV represents the expected amount of profit gained by the online retailer system 106 from future purchases made by the new customer on the online retail website facilitated by the online retailer system 106. The CLV calculation module 210 calculates the CLV using any of a variety of known techniques in the art. For example, the CLV module uses demographic data provided by the new customer to calculate the CLV for the new customer.

The CLV calculation module 210 also calculates a CLV credit to be assigned to the affiliate webserver 104 for driving the new customer to the online retailer system 106. A CLV credit is a portion of the CLV that is assigned to the affiliate webserver 104 as a reward for driving the new customer to the online retailer system 106. The CLV calculation module 210 uses any of a variety of methods for calculating the CLV credit. For example, the CLV credit may simply be a percentage of the total CLV for the new customer, such as 10% of the CLV.

The credit issuing module 212 assigns a CLV credit to an account associated with the affiliate webserver 104 that drove the new customer to the online retailer system 106. The account may be an internal account maintained by the online retailer system 106, for example, in data storage 216. The account may be associated with the unique affiliate identifier for the affiliate webserver. In this type of embodiment, the credit issuing module 212 communicates with the data storage 216 to access the account associated with the affiliate webserver 104 and updates the account to assign the CLV credit to the account.

In other embodiments, the credit issuing module 212 assigns a CLV credit to an account associated with the affiliate webserver 104 that is maintained by a financial institutions webserver. The credit issuing module 212 maintains a listing of financial information for affiliates of the online retail system 106. The financial information includes account information for the affiliates that the credit issuing module 212 uses to communicate with a financial institution webserver and cause an account associated with the affiliate to be assigned with the CLV credit. Assigning a CLV credit includes crediting the affiliate's account with a monetary value defined by the CLV credit. The monetary value is assigned to the affiliate's account from an account associated with the online retailer system 106. In this way the online retailer system 106 pays affiliates for driving new customers to the online retailer system 106.

Prior systems would assign the entire CLV credit to the affiliate's account at one time. For example, the entire CLV credit would be assigned to the affiliate's account when the affiliate directed a new customer to the online retail website (e.g., the new customer made a purchase with the online retail website). The problem with this approach is that sometimes the new customer would not continue to make purchases with the online retail website, and thus not generate the CLV for the customer (i.e., the expected net profit to the online retailer system 106 that is attributed to the future relationship with the new customer). Accordingly, the credit issuing module 212 assigns only a portion of the CLV credit to the affiliate initially, and then assigns additional portions of the CLV credit to the affiliate at predetermined time intervals based on the new customer's monitored engagement with the online retailer system 106. For example, the affiliate is assigned another portion of the CLV credit for each predetermined time interval in which the new customer makes at least a threshold number (e.g., 1, 2, etc.) purchases with the online retail website and/or spends a predetermined amount of money (e.g., $10, $20, etc.) with the online retail website. In this way the entirety of the CLV credit is assigned to the affiliate if the new customer fulfills their CLV (i.e., the expected net profit to the online retailer system 106 that is attributed to the future relationship with the new customer), and the online retailer system 106 does not overpay for a new customer that does not fulfil the their CLV.

The engagement monitoring module 214 monitors user engagement to determine whether additional portions of the CLV credit should be assigned to a corresponding affiliate that drove the user to the online retailer system 106. As explained above, the affiliate is awarded additional portions of the CLV credit for each predetermined time period in which the new customer performs a predetermined action or meets a predetermined engagement threshold. Accordingly, the engagement monitoring module 214 accesses a user's account in the data storage 216 and reviews the user's engagement history, which indicates actions performed by the user in relation to the online retailer system 106. For example, the user's engagement history indicates purchases made by the user, items viewed by the user, an amount of money spent by the user, etc. The engagement monitoring module 214 determines, based on the user's engagement history, whether the user has performed any of the predetermined actions or has met the predetermined engagement threshold during a predetermined time period. For example, the engagement monitoring module 214 determines whether the user has made a threshold number of purchases or spent a threshold amount of money on purchases during the predetermined time period. If the engagement monitoring module 214 determines that the user has performed a predetermined action or met a predetermined engagement threshold during the predetermined time period, the engagement monitoring module 214 alerts the credit issuing module 212 to assign an additional portion of the CLV credit to the affiliate.

The engagement monitoring module 214 may continuously monitor engagement of users or, alternatively, monitor engagement at the end of each predetermined time period. For example, at the end of each predetermined time period, the engagement monitoring module 214 would access the user's account in the data storage 216 to review the user's engagement history. By leveraging such capabilities, the CVL reward apportionment process of the instant application can be implemented.

Figure 3A:
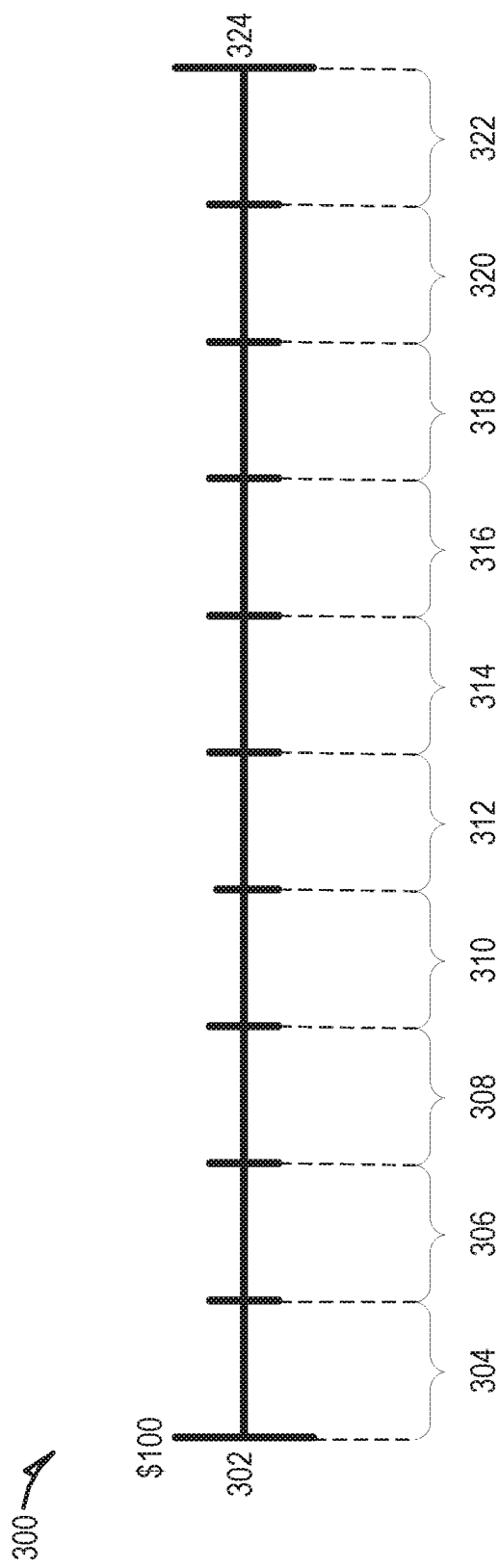
FIGS. 3A-3C show an example of assigning a CLV credit based on engagement, according to some example embodiments.
Figure 3B:
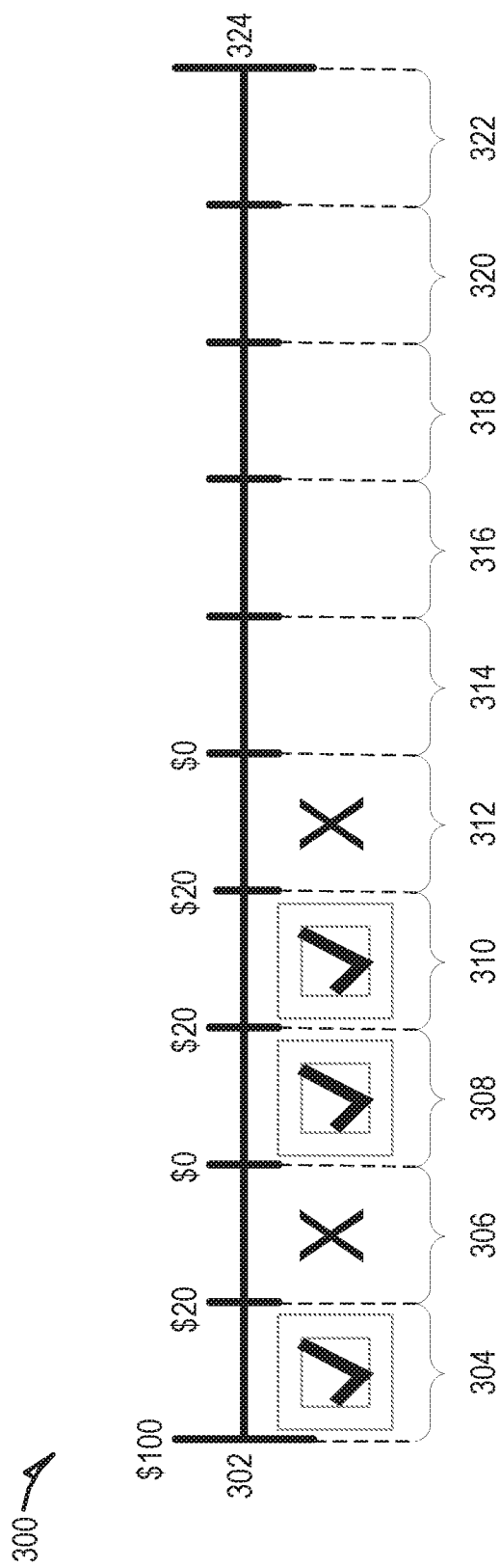
Figure 3C:
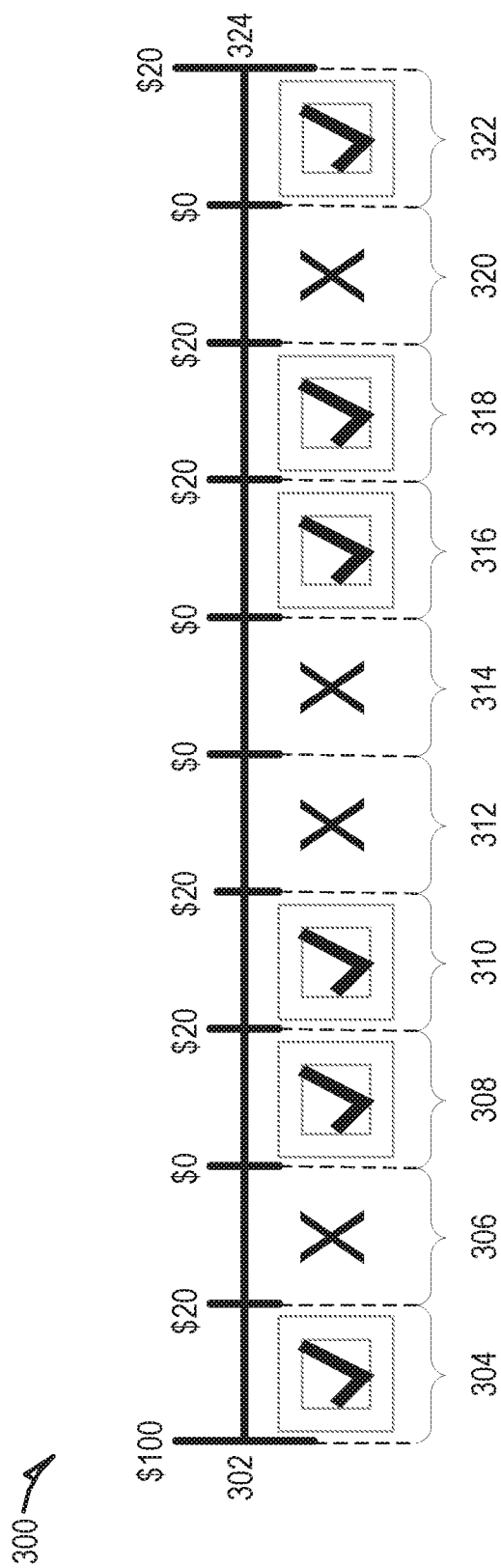

FIGS. 3A-3C show an example of assigning a CLV credit based on engagement, according to some example embodiments. The illustrated timeline 300 indicates time periods extending from a new customer making an initial purchase at start time 302 of the time line to an end time 324 of the time line when the entirety of the CLV credit is potentially assigned to an affiliate that drove the new customer to the online retailer system 106. As shown, the timeline is broken into 10 predetermined time periods 304-322 during which engagement of the new customer is monitored. In this example, the new customer's CLV credit is $300 and the affiliate has been assigned $100 at the start time 302 when the new customer completed the purchase. In this example, the affiliate will be assigned an additional $20 for each of the predetermined time periods 304-322 during which the new customer performs a predetermined action or meets a predetermined engagement threshold. Although in this example the CLV credit portions are all the same amount, as are the predetermined time periods, this is only one example and is not meant to be limiting. The portions of the CLV credits may be of varying amounts per predetermined time period, as may the length of the predetermined time periods.

As shown in FIG. 3B, the new customer has performed a predetermined action or met the predetermined engagement threshold during predetermined time periods 304, 308 and 310, and not performed a predetermined action or met the predetermined engagement threshold during predetermined time periods 306 and 312. Accordingly, the affiliate is assigned a portion of the CLV credit for only predetermined time periods 304, 308 and 310, and has not been assigned a portion of the CLV credit for predetermined time periods 306 and 312.

As shown in FIG. 3C, the new customer has additionally performed a predetermined action or met the predetermined engagement threshold during predetermined time periods 316, 318 and 322, and not performed a predetermined action or met the predetermined engagement threshold during predetermined time periods 314 and 320. Accordingly, the affiliate is assigned additional portions of the CLV credit for only predetermined time periods 316, 318 and 322, and has not been assigned a portion of the CLV credit for predetermined time periods 314 and 320. As shown, the affiliate is assigned only $220 of the CLV credit based on engagement, rather than the entire $300 credit as would have resulted using prior methods.

Figure 4:
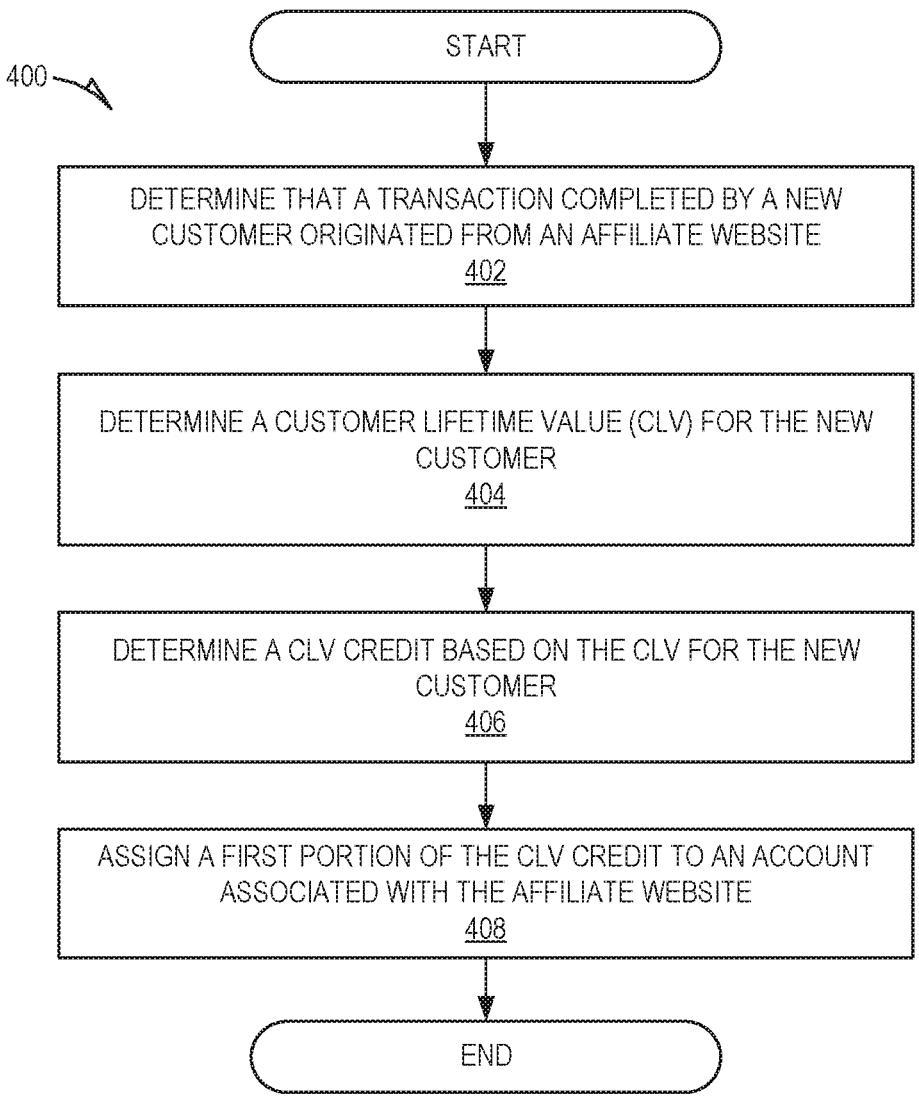
FIG. 4 is a flowchart showing an example method of assigning a CLV credit based on engagement, according to certain example embodiments.

FIG. 4 is a flowchart showing an example method 400 of assigning a CLV credit based on engagement, according to certain example embodiments. The method 400 may be embodied in computer readable instructions for execution by one or more computer processors such that the operations of the method 400 may be performed in part or in whole by the online retailer system 106; accordingly, the method 400 is described below by way of example with reference thereto. However, it shall be appreciated that at least some of the operations of the method 400 may be deployed on various other hardware configurations and the method 400 is not intended to be limited to the particulars of the online retailer system 106.

At operation 402, the credit triggering module 208 determines that a transaction completed by a new customer originated from an affiliate website. For example, a request to access web content at the online retailer system 106 may include an affiliate identifier indicating that the user was driven to the online retailer system 106 as a result of affiliate content presented on the affiliate website.

At operations 404, the CLV calculation module 210 determines a CLV for the new customer. A CLV represents an expected net profit to the online retailer system 106 that is attributed to the future relationship with the new customer. For example, the CLV represents the expected amount of profit gained by the online retailer system 106 from future purchases made by the new customer on the online retail website facilitated by the online retailer system 106. The CLV calculation module 210 calculates the CLV using any of a variety of known techniques in the art. For example, the CLV module uses demographic data provided by the new customer to calculate the CLV for the new customer.

At operation 406, the CLV calculation module 210 determines a CLV credit based on the CLV for the new customer. The CLV calculation module 210 also calculates a CLV credit to be assigned to the affiliate webserver 104 for driving the new customer to the online retailer system 106. A CLV credit is a portion of the CLV that is assigned to the affiliate webserver 104 as a reward for driving the new customer to the online retailer system 106. The CLV calculation module 210 uses any of a variety of methods for calculating the CLV credit. For example, the CLV credit may simply be a percentage of the total CLV for the new customer, such as 10% of the CLV.

At operation 408, the credit issuing module 212 assigns a first portion of the CLV credit to an account associated with the affiliate website. The account may be an internal account maintained by the online retailer system 106, for example, in data storage 216. The account may be associated with the unique affiliate identifier for the affiliate webserver. In this type of embodiment, the credit issuing module 212 communicates with the data storage 216 to access the account associated with the affiliate webserver 104 and updates the account to assign the CLV credit to the account.

In other embodiments, the credit issuing module 212 assigns a CLV credit to an account associated with the affiliate webserver 104 that is maintained by a financial institutions webserver. The credit issuing module 212 maintains a listing of financial information for affiliates of the online retail system 106. The financial information includes account information for the affiliates that the credit issuing module 212 uses to communicate with a financial institution webserver and cause an account associated with the affiliate to be assigned with the CLV credit. Assigning a CLV credit includes crediting the affiliate's account with a monetary value defined by the CLV credit. The monetary value is assigned to the affiliate's account from an account associated with the online retailer system 106. In this way the online retailer system 106 pays affiliates for driving new customers to the online retailer system 106.

Prior systems assign the entire CLV credit to the affiliate's account at one time. For example, the entire CLV credit would be assigned to the affiliate's account when the affiliate directed a new customer to the online retail website (e.g., the new customer made a purchase with the online retail website). The problem with this approach is that sometimes the new customer would not continue to make purchases with the online retail website, and thus not generate the CLV for the customer (i.e., the expected net profit to the online retailer system 106 that is attributed to the future relationship with the new customer). Accordingly, the credit issuing module 212 assigns only a portion of the CLV credit to the affiliate initially, and then assigns additional portions of the CLV credit to the affiliate at predetermined time intervals based on the new customer's monitored engagement with the online retailer system 106. For example, the affiliate is assigned another portion of the CLV credit for each predetermined time interval in which the new customer makes at least a threshold number (e.g., 1, 2, etc.) purchases with the online retail website and/or spends a predetermined amount of money (e.g., $10, $20, etc.) with the online retail website. In this way the entirety of the CLV credit is assigned to the affiliate if the new customer fulfills their CLV (i.e., the expected net profit to the online retailer system 106 that is attributed to the future relationship with the new customer), and the online retailer system 106 does not overpay for a new customer that does not fulfil the their CLV.

Ensuring a more efficient economic transaction of these transactions leads to a more efficient use of computing processor-power and resources. Rather than assessing each referral as a new and independent transaction that requires an isolated and stand-alone operation, the system in the current invention leverages the user and affiliate account identifiers to efficiently allocate capital over the customer lifetime—if and as needed. Accordingly, this reward system yields a more nuanced and flexible approach that takes advantage of the ability to keep track of affiliates and customers, thereby avoiding the more brittle systems of the past.

Figure 5:
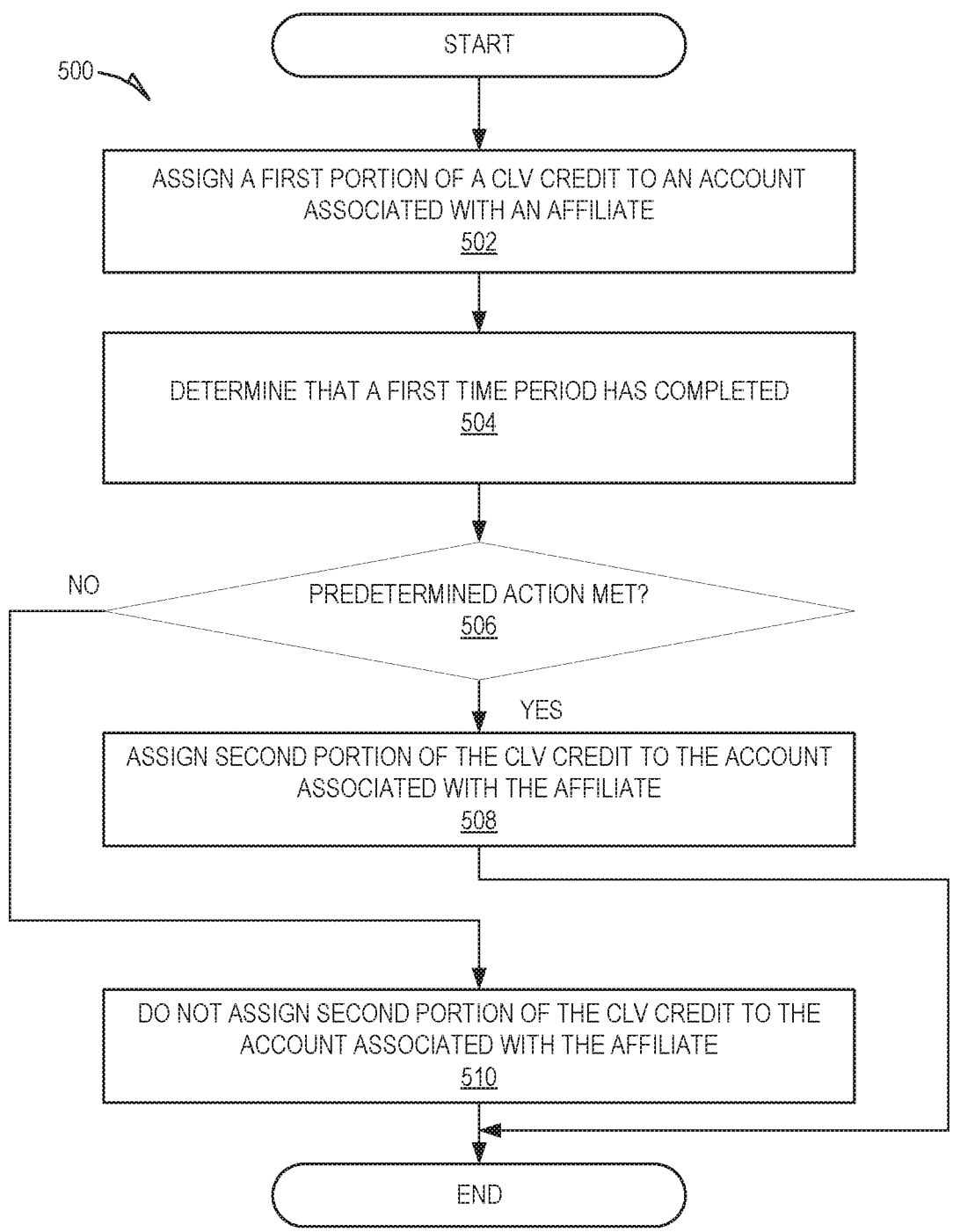
FIG. 5 is a flowchart showing another example method of assigning a CLV credit based on engagement, according to certain example embodiments.

FIG. 5 is a flowchart showing another example method 500 of assigning a CLV credit based on engagement, according to certain example embodiments. The method 500 may be embodied in computer readable instructions for execution by one or more computer processors such that the operations of the method 500 may be performed in part or in whole by the online retailer system 106; accordingly, the method 500 is described below by way of example with reference thereto. However, it shall be appreciated that at least some of the operations of the method 500 may be deployed on various other hardware configurations and the method 500 is not intended to be limited to the online retailer system 106.

At operation 502, the credit issuing module 212 assigns a first portion of a CLV credit to an account associated with an affiliate. As explained above, the first portion of the CLV credit is a subset of the entire CLV credit. The affiliate is assigned additional portions of the CLV credit based on the user's (new customer's) monitored future engagement.

At operation 504, the engagement monitoring module 214 determines that a first time period has completed. The first time period may be any predetermined period of time after the user performs the initial action (e.g., transaction) that triggers the affiliate being awarded the CLV credit. The first time period is a subset of an entire time period during which the affiliate may potentially be awarded the entire CLV credit. For example, the predetermined time period is three months and the entire time period is a year. As another example, the predetermined time period is three months and the entire time period is three years.

At operation 506, the engagement monitoring module 214 determines whether a predetermined action was completed during the first time period. The engagement monitoring module 214 monitors user engagement to determine whether additional portions of the CLV credit should be assigned to a corresponding affiliate that drove the user to the online retailer system 106. As explained above, the affiliate is awarded additional portions of the CLV credit for each predetermined time period in which the new customer performs a predetermined action or meets a predetermined engagement threshold. Accordingly, the engagement monitoring module 214 accesses a user's account in the data storage 216 and reviews the user's engagement history, which indicates actions performed by the user in relation to the online retailer system 106. For example, the user's engagement history indicates purchases made by the user, items viewed by the user, an amount of money spent by the user, etc. The engagement monitoring module 214 determines, based on the user's engagement history, whether the user has performed any of the predetermined actions or has met the predetermined engagement threshold during a predetermined time period. For example, the engagement monitoring module 214 determines whether the user has made a threshold number of purchases or spent a threshold amount of money on purchases during the predetermined time period. If the engagement monitoring module 214 determines that the user has performed a predetermined action or met a predetermined engagement threshold during the predetermined time period, the engagement monitoring module 214 alerts the credit issuing module 212 to assign an additional portion of the CLV credit to the affiliate.

The engagement monitoring module 214 may continuously monitor engagement of users or, alternatively, monitor engagement at the end of each predetermined time period. For example, at the end of each predetermined time period, the engagement monitoring module 214 would access the user's account in the data storage 216 to review the user's engagement history.

If the engagement monitoring module 214 determines that a predetermined action was completed during the first time period, at operation 508 the credit issuing module 212 assigns a second portion of the CLV credit to the account associated with the affiliate. Alternatively, if the engagement monitoring module 214 determines that a predetermined action was not completed during the first time period, at operation 510 the credit issuing module 212 does not assign the second portion of the CLV credit to the account associated with the affiliate. Accordingly, the affiliate may earn the entire CLV credit if the user performs specified actions during each predetermined time period after the initial transaction is performed. The sum of all of the portions of the CLV credits that the affiliate may be awarded equals the entire CLV credit. Accordingly, the sum or the portions of the CLV credit is no greater than the CLV credit.

The distribution of the entire CLV credit across user transactions preformed provides reassurance to parties providing affiliate rewards that engagement of affiliates is economically sensible. In doing so, the system produces a more efficient system of web-traffic. Affiliate programs provide a streamlined manner of routing user-traffic to online retailer sites. The alternative manner of achieving user to a retailer website is browsing and tedious search and scanning systems that consume significantly more bandwidth. Accordingly, by incentivizing the use of affiliate systems with the improvements disclosed herein and jettisoning the rigid one-time credit systems, the result is a better functioning networked system.

Figure 6:
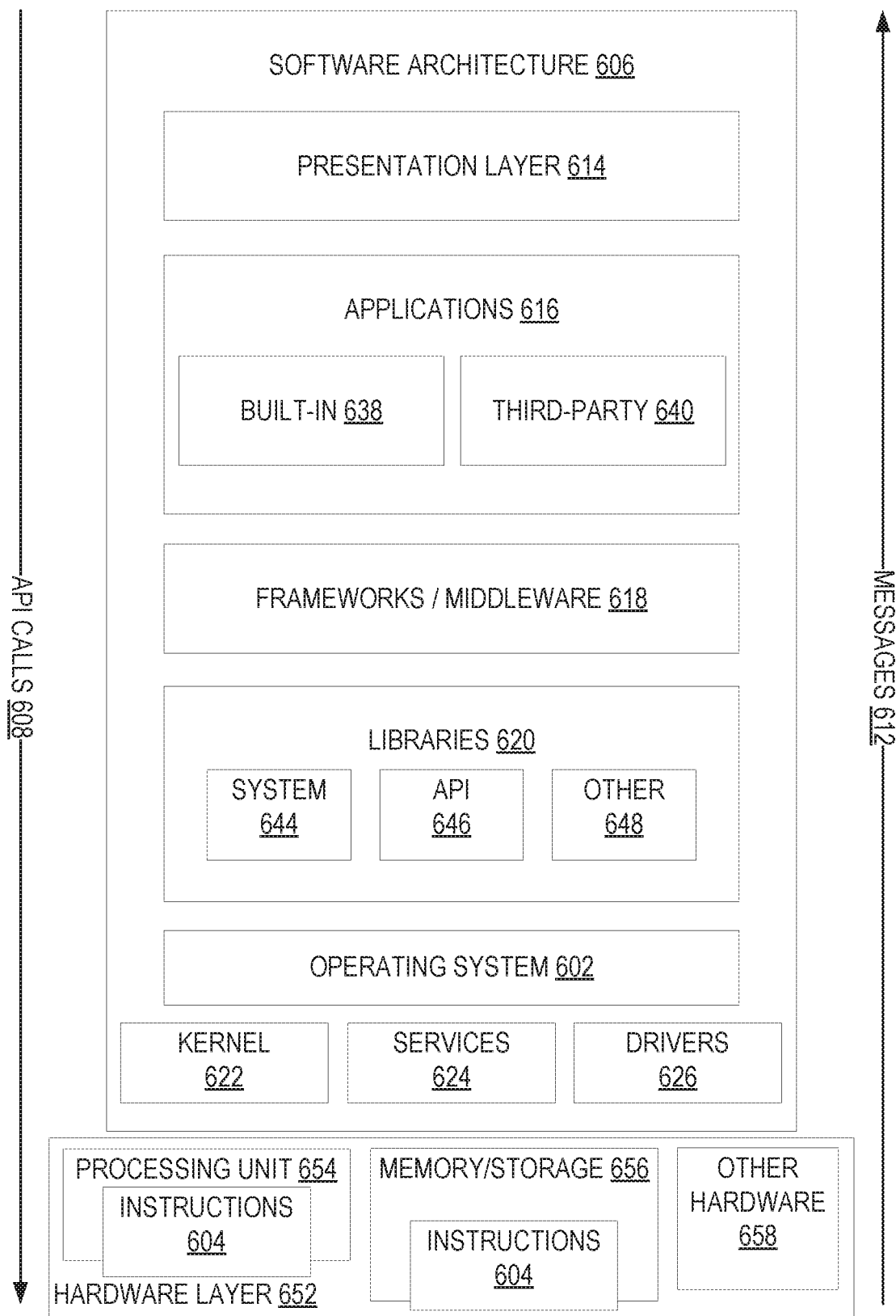
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
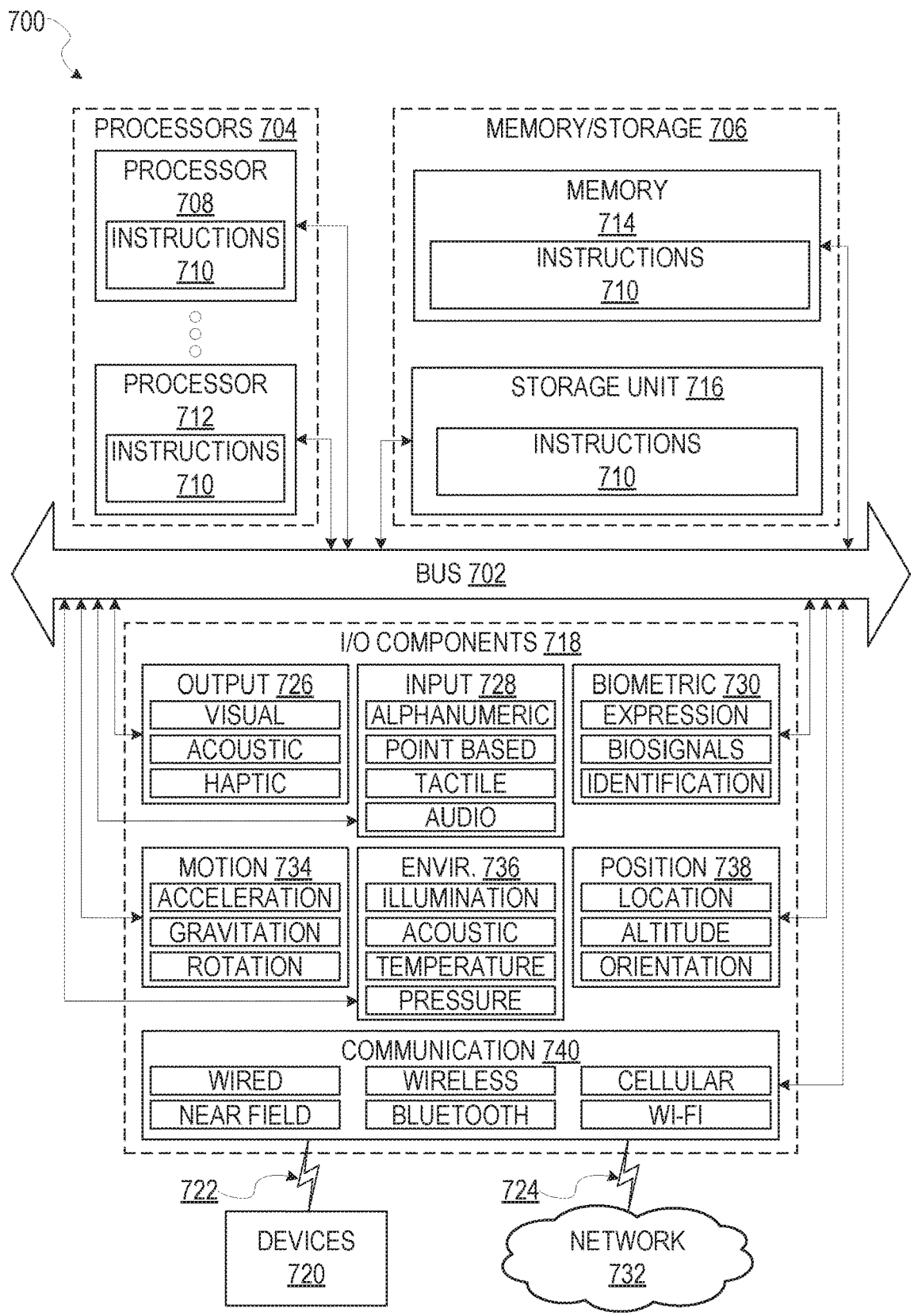
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth. "CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device 102 may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 704 (sometimes referred to as "cores") that may execute instructions 710 contemporaneously.

Although the subject matter has been described with reference to some specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   determining that a first transaction completed by a user on an online retailer website originated from a third party website;
   in response to determining that the first transaction originated from the third party website:
   generating a record within a user profile of the online retailer website that is allocated to the user, the record including an affiliate partner identifier assigned to the third party website, first time data based on completion of the first transaction, and second time data defining a first time interval after completion of the first transaction;
   determining a customer lifetime value (CLV) credit to be assigned to the third party website for originating the user, the CLV credit being determined based on a CLV for the user, the CLV based on an estimated monetary amount that the user will spend with the online retailer website over a predetermined period of time; and
   assigning, to an account associated with the affiliate partner identifier assigned to the third party website online retailer, a first portion of the CLV credit, the first portion of the CLV credit being less than the CLV credit;
   subsequently recording, in the user profile, engagement data describing detected occurrences of specified user interactions with the online retailer website that are attributed to the user;
   gathering, based on the first time data and the second time data, a portion of the engagement data describing detected occurrence of specified interactions that occurred during the first time interval; and
   in response to determining, based on the portion of the engagement data, that the user completed at least one additional transaction during the first time interval, assigning, to the account associated with the affiliate partner identifier, a second portion of the CLV credit, a sum of the first portion of the CLV credit and the second portion of the CLV credit being no greater than the CLV credit.

2. The method of claim 1, wherein the predetermined period of time is one year and the first period of time interval is three months.

3. The method of claim 1, wherein the predetermined period of time is three years and the first period of time interval is three months.

4. The method of claim 1, further comprising:
determining that the user completed at least one additional transaction during a second time interval after the first period of time interval; and
in response to determining that the user completed the at least one additional transaction during the second time interval, assigning, to the account associated with the affiliate partner identifier, a third portion of the CLV credit, a sum of the first portion of the CLV credit, the second portion of the CLV credit, and the third portion of the CLV credit being no greater than the CLV credit.

5. The method of claim 1, further comprising:
determining that the user did not complete at least one additional transaction during a second time interval after the first time interval, wherein the account associated with the affiliate partner identifier is not assigned a third portion of the CLV credit associated with the second time interval.

6. A system comprising:
one or more computer processors; and
one or more computer-readable mediums storing instructions that, when executed by the one or more computer processors, cause the system to perform operations comprising:
determining that a first transaction completed by a user on an online retailer website originated from a third party website;
in response to determining that the first transaction originated from the third party website:
generating a record within a user profile of the online retailer website that is allocated to the user, the record including an affiliate partner identifier assigned to the third party website, first time data based on completion of the first transaction, and second time data defining a first time interval after completion of the first transaction;
determining a customer lifetime value (CLV) credit to be assigned to the third party website for originating the user, the CLV credit being determined based on a CLV for the user, the CLV based on an estimated monetary amount that the user will spend with the online retailer website over a predetermined period of time; and
assigning, to an account associated with the affiliate partner identifier assigned to the third party website online retailer, a first portion of the CLV credit, the first portion of the CLV credit being less than the CLV credit;
subsequently recording, in the user profile, engagement data describing detected occurrences of specified user interactions with the online retailer website that are attributed to the user,
gathering, based on the first time data and the second time data, a portion of the engagement data describing detected occurrence of specified interactions that occurred during the first time interval; and
in response to determining, based on the portion of the engagement data, that the user completed at least one additional transaction during the first time interval, assigning, to the account associated with the affiliate partner identifier, a second portion of the CLV credit, a sum of the first portion of the CLV credit and the second portion of the CLV credit being no greater than the CLV credit.

7. The system of claim 6, wherein the predetermined period of time is one year and the first time interval is three months.

8. The system of claim 6, wherein the predetermined period of time is three years and the first time interval is three months.

9. The system of claim 6, the operations further comprising:
determining that the user completed at least one additional transaction during a second time interval after the first time interval; and
in response to determining that the user completed the at least one additional transaction during the second time interval, assigning, to the account associated with the affiliate partner identifier, a third portion of the CLV credit, a sum of the first portion of the CLV credit, the second portion of the CLV credit, and the third portion of the CLV credit being no greater than the CLV credit.

10. The system of claim 6, the operations further comprising:
determining that the user did not complete at least one additional transaction during a second time interval after the first time interval, wherein the account associated with the affiliate partner identifier is not assigned a third portion of the CLV credit associated with the second time interval.

11. A non-transitory computer-readable medium storing instructions that, when executed by one or more computer processors of an online retailer system, cause the online retailer system to perform operations comprising:
determining that a first transaction completed by a user on an online retailer website originated from a third party website;
in response to determining that the first transaction originated from the third party website:
generating a record within a user profile of the online retailer website that is allocated to the user, the record including an affiliate partner identifier assigned to the third party website, first time data based on completion of the first transaction, and second time data defining a first time interval after completion of the first transaction;
determining a customer lifetime value (CLV) credit to be assigned to the third party website for originating the user, the CLV credit being determined based on a CLV for the user, the CLV based on an estimated monetary amount that the user will spend with the online retailer website over a predetermined period of time; and
assigning, to an account associated with the affiliate partner identifier assigned to the third party website online retailer, a first portion of the CLV credit, the first portion of the CLV credit being less than the CLV credit;
subsequently recording, in the user profile, engagement data describing detected occurrences of specified user interactions with the online retailer website that are attributed to the user;
gathering, based on the first time data and the second time data, a portion of the engagement data describing detected occurrence of specified interactions that occurred during the first time interval; and
in response to determining, based on the portion of the engagement data, that the user completed at least one additional transaction during the first time interval, assigning, to the account associated with the affiliate partner identifier, a second portion of the CLV credit, a sum of the first portion of the CLV credit and the second portion of the CLV credit being no greater than the CLV credit.

12. The non-transitory computer-readable medium of claim 11, wherein the predetermined time is one year and the first period of time interval is three months.

13. The non-transitory computer-readable medium of claim 11, the operations further comprising:
   determining that the user completed at least one additional transaction during a second time interval after the first time interval; and
   in response to determining that the user completed the at least one additional transaction during the second time interval, assigning, to the account associated with the affiliate partner identifier, a third portion of the CLV credit, a sum of the first portion of the CLV credit, the second portion of the CLV credit, and the third portion of the CLV credit being no greater than the CLV credit.

14. The non-transitory computer-readable medium of claim 11, the operations further comprising:
   determining that the user did not complete at least one additional transaction during a second time interval after the first time interval, wherein the account associated with the affiliate partner identifier is not assigned a third portion of the CLV credit associated with the second time interval.

* * * * *